United States Patent [19]

Masuda et al.

[11] Patent Number: 4,556,026
[45] Date of Patent: Dec. 3, 1985

[54] MULTIPLE-DISPLACEMENT ENGINE

[75] Inventors: Shunji Masuda; Hisashi Nakaya; Katumi Okazaki, all of Hiroshima, Japan

[73] Assignee: Mazda Motor Corporation, Japan

[21] Appl. No.: 712,915

[22] Filed: Mar. 18, 1985

Related U.S. Application Data

[63] Continuation of Ser. No. 643,146, Aug. 22, 1984, abandoned.

[30] Foreign Application Priority Data

Aug. 31, 1983 [JP]  Japan .................................. 58-159732

[51] Int. Cl.$^4$ ...................... F02D 17/00; F16F 15/26
[52] U.S. Cl. .............................. 123/198 F; 123/192 B
[58] Field of Search ......... 123/198 F, 192 B, DIG. 6, 123/DIG. 7

[56] References Cited

U.S. PATENT DOCUMENTS

| 4,000,666 | 1/1977 | Ito et al. ............................ 123/192 B |
| 4,095,579 | 6/1978 | Iwasa et al. ....................... 123/192 B |
| 4,125,036 | 11/1978 | Nakamura et al. ............... 123/192 B |
| 4,290,395 | 9/1981 | Sakano et al. ..................... 123/192 B |
| 4,337,740 | 7/1982 | Sugasawa et al. ................ 123/198 F |
| 4,368,701 | 1/1983 | Huber et al. ....................... 123/198 F |
| 4,389,985 | 6/1983 | Huber et al. ....................... 123/198 F |
| 4,394,854 | 7/1983 | Huber ................................ 123/198 F |

FOREIGN PATENT DOCUMENTS

| 637117 | 2/1962 | Canada ............................. 123/192 B |
| 52-67420 | 6/1977 | Japan . |
| 57-338 | 1/1982 | Japan . |
| 2100800 | 1/1983 | United Kingdom ............. 123/192 B |

Primary Examiner—Ira S. Lazarus
Attorney, Agent, or Firm—Murray, Whisenhunt and Ferguson

[57] ABSTRACT

A multiple-displacement engine which can be operated either in a full-displacement state in which all the cylinders are operative or a part-displacement state in which a part of the cylinders are inoperative is provided with a balancer for attenuating torque fluctuation due to explosion in the operative cylinders in the part-displacement state of the engine. The engine is further provided with a balancer actuator which actuates the balancer when the engine is operated in the part-displacement state.

8 Claims, 12 Drawing Figures

MULTIPLE-DISPLACEMENT ENGINE

This application is a continuation of Ser. No. 643,146, filed Aug. 22, 1984, now abandoned.

BACKGROUND OF THE INVENTION

1. Field of the Invention

This invention relates to a multiple-displacement engine in which operating state of the engine can be changed between a full-displacement state in which all the cylinders output power and a part-displacement state in which a part of the cylinders are cut out or are made inoperative according to the operating condition of the engine.

2. Description of the Prior Art

In order to improve fuel economy, there has been proposed a multiple-displacement engine which can be operated either in a full-displacement state or in a part-displacement state according to the operating condition of the engine. Generally in engines of the kind, fuel supply to a part of the cylinders is cut to make inoperative the cylinders (the part-displacement state) when the engine is operated at a low speed under light load. Accordingly, the engine is generally operated in the part-displacement state when it is idling.

Figure 1:
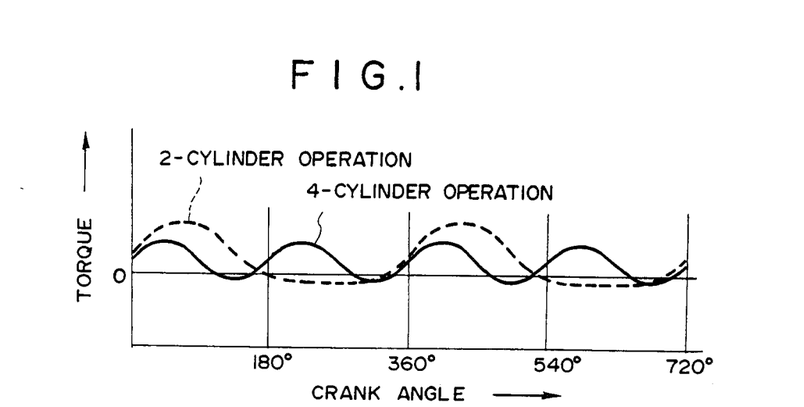
FIG. 1 is a graph for illustrating the problem solved by the present invention.

Even when the engine is operated in the full-displacement state, the engine vibrates stronger when the engine is idling than in other operating regions. When the engine is idling in the part-displacement operation of the engine, the engine vibrates further strong. The solid line in FIG. 1 shows the vibration of the engine when the four-cylinder engine is idling in the full-displacement state (all the four cylinders are operative), while the dotted line shows the vibration of the engine when the same engine is idling in the half-displacement state (only two cylinders are operative). As can be seen from FIG. 1, when the engine is idling in the half-displacement state, the number of peaks of the vibration is reduced to the half of that when the engine is idling in the full-displacement state. On the other hand, the amplitude of torque fluctuation is substantially enlarged when the engine is idling in the half-displacement state. Accordingly, in the multiple-displacement engine, there is a problem that the driving comfort is lowered during idling.

SUMMARY OF THE INVENTION

In view of the foregoing observations and description, the primary object of the present invention is to provide an improved multiple-displacement engine in which the torque fluctuation or the power surges generated as power strokes of working cylinders hit the crankshaft while the engine is operating in the part-displacement state, especially when the engine is idling in the part-displacement state, can be smoothed out whereby the driving comfort of the vehicles having the multiple-displacement engine can be improved.

The multiple-displacement engine of the present invention is characterized by having a balancer means for generating moment which attenuates torque fluctuation due to explosion in the operative cylinders in the part-displacement operation of the engine, and a balancer actuating means which actuates the balancer means when the engine is operated in the part-displacement state.

DESCRIPTION OF THE PREFERRED EMBODIMENT

Figure 2:
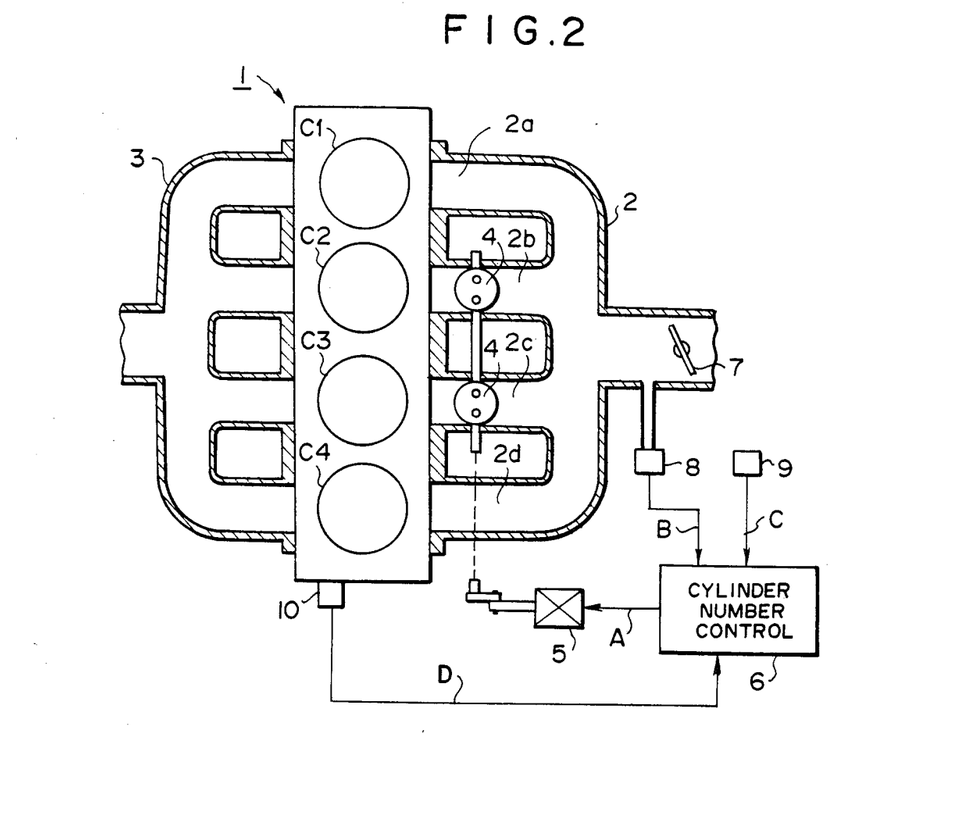
FIG. 2 is a schematic view showing an example of a multiple-displacement engine to which the present invention is applicable.

In FIG. 2, an engine 1 in accordance with an embodiment of the present invention has first to fourth cylinders C1 to C4. An intake manifold 2 for supplying air-fuel mixture to the cylinders C1 to C4 is mounted on one side of the engine 1, and an exhaust manifold 3 for correcting exhaust discharged from the cylinders C1 to C4 is mounted on the opposite side of the engine 1. The intake manifold 2 is divided into first to fourth intake passages 2a to 2d respectively communicated with the first to fourth cylinders C1 to C4. The second and third intake passages 2b and 2c respectively communicated with the second and third cylinders C2 and C3 are provided with shutter valves 4. The shutter valves 4 are integrally opened and closed by an actuator 5. The actuator 5 closes both the shutter valves 4 when it receives an cylinder-reduction signal A outputted from a cylinder number control circuit 6.

To the cylinder number control circuit 6 are inputted an intake vacuum signal B outputted from a vacuum sensor 8 disposed downstream of the throttle valve 7 in the intake manifold 2, an engine speed signal C outputted from an engine speed sensor 9, a water temperature signal D from a water temperature sensor 10 which detects the temperature of engine cooling water. The signals B, C and D are respectively inputted into comparators 11, 12 and 13 in the cylinder number control circuits 6 to be respectively compared with preset values stored in reference value setting circuits 11', 12' and 13'. The comparator 11 outputs an output signal E when the intake vacuum of the engine 1 represented by the intake vacuum signal B is higher than the preset value, i.e. when load on the engine 1 is relatively light. the comparator 12 outputs an output signal F when the engine speed represented by the engine speed signal C is not higher than the preset value. The comparator 13 outputs an output signal G when the temperature of engine cooling water represented by the water temperature signal D is not lower than the preset value. When the output signals E and F are simultaneously outputted from the comparators 11 and 12, that is, the intake vacuum of the engine 1 is not lower than the preset value V0 and at the same time the engine speed is not higher than the preset value S0 as represented by the hatched region in FIG. 4, a second output signal H is outputted from an AND circuit 14 into which the output signals E and F are inputted. The second output signal H and the output signal G which is generated when the cooling water temperature is not lower than the preset value are inputted into a gate 15. The gate 15 permits the second output signal H to pass therethrough when the output signal G is inputted thereinto to form said cylinder-reduction signal A. That is, the gate 15 outputs the cylinder-reduction signal A only when the operating region of the engine 1 is in the hatched region in FIG. 4 and at the same time the cooling water temperature is not lower than the preset value. The cylinder-reduction signal A is delivered to said actuator 5 by way of an amplifier 16.

Figure 5:
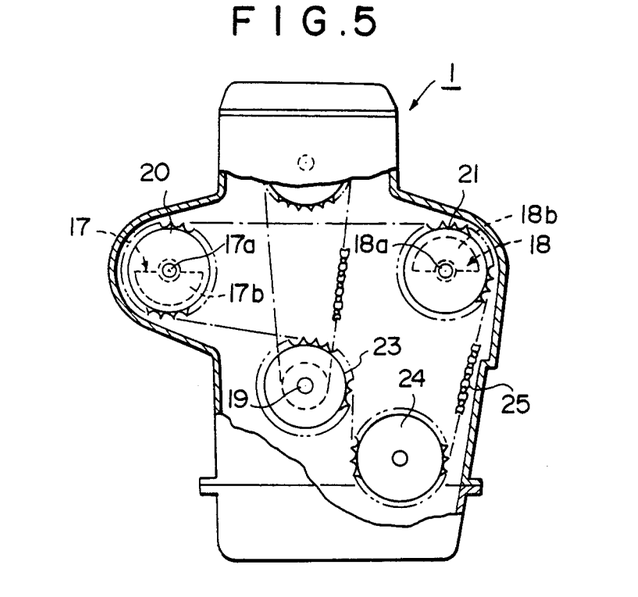
FIG. 5 is a front elevational view partly broken showing a multiple-displacement engine in accordance with an embodiment of the present invention.
Figure 6:
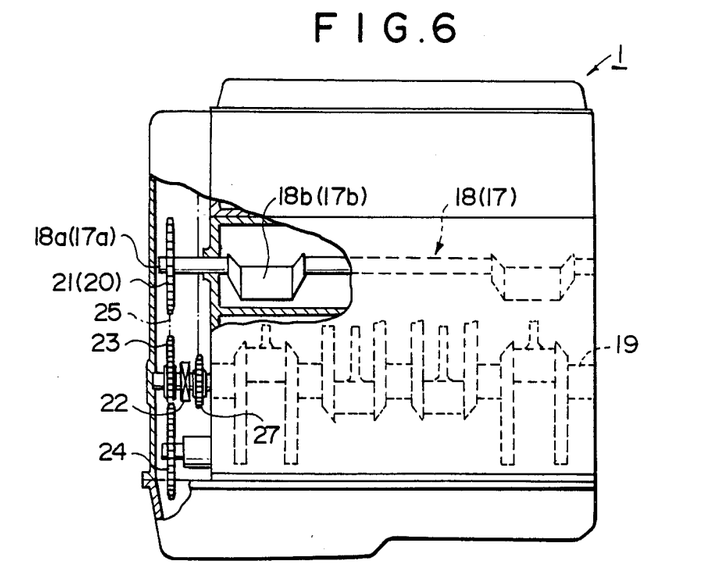
FIG. 6 is a side elevational view partly broken of the same.

The engine 1 of this embodiment, whose operating state is thus changed to the part-displacement state, is provided with first and second balancers 17 and 18 as shown in FIG. 5. The balancers 17 and 18 are identical to each other in structure, and therefore only the structure of the second balancer 18 will be described referring to FIG. 6. The balancer 18 comprises a shaft portion 18a extending in parallel to crankshaft 19 and a pair of weight portions 18b eccentrically provided on the shaft portion 18a. Taking into account the balance of the balancer 18 itself, a pair of weight portions 18b are provided on the respective end portions of the shaft portion 18a. Sprockets 20 and 21 are respectively provided on one end portions of the first and second balancers 17 and 18. A chain 25 is passed around the sprockets 20 and 21, a balancer driving sprocket 23 connected to the end of the crankshaft 19 by way of an electromagnetic clutch 22, and an idle sprocket 24 so that the balancers 17 and 18 rotate driven by the crankshaft 19 when the electromagnetic clutch 22 is engaged. The balancers 17 and 18 rotate at a speed equal to the rotating speed of the crankshaft 19 but in the direction opposite to the crankshaft 19 in this embodiment.

Figure 3:
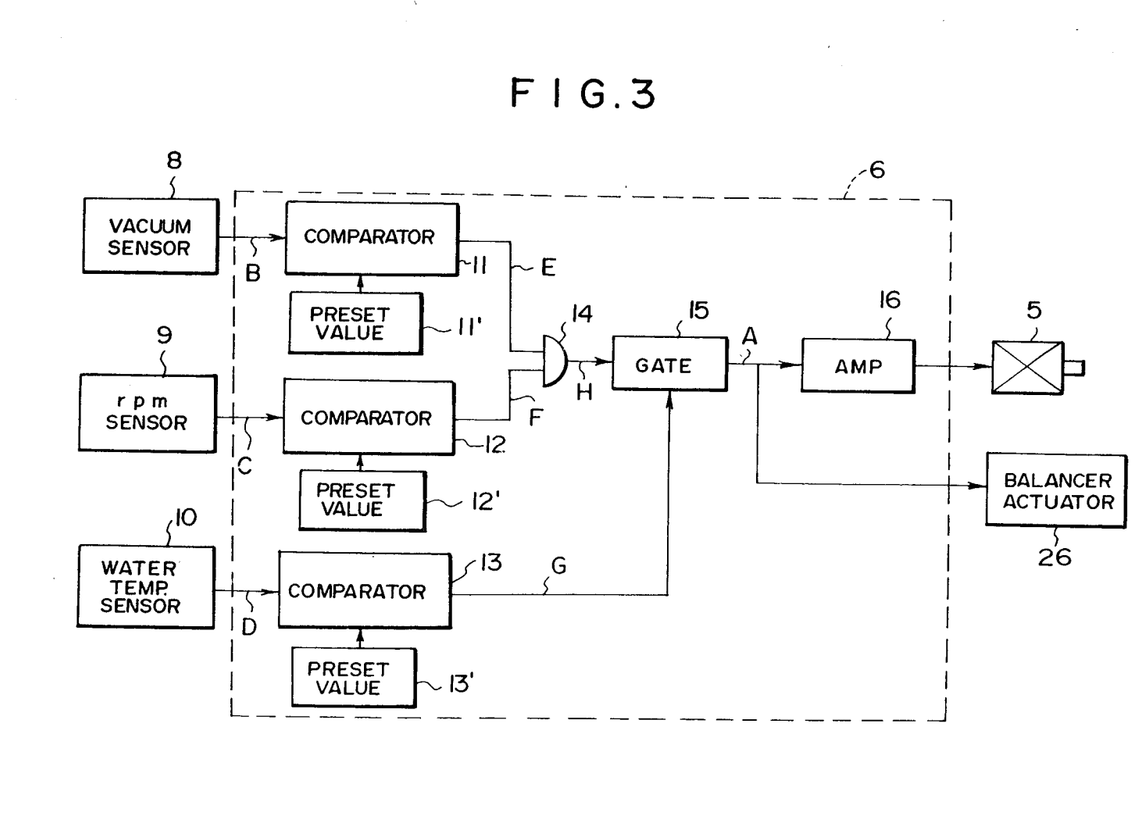
FIG. 3 is a block diagram of the control circuitry of the engine.
Figure 7:
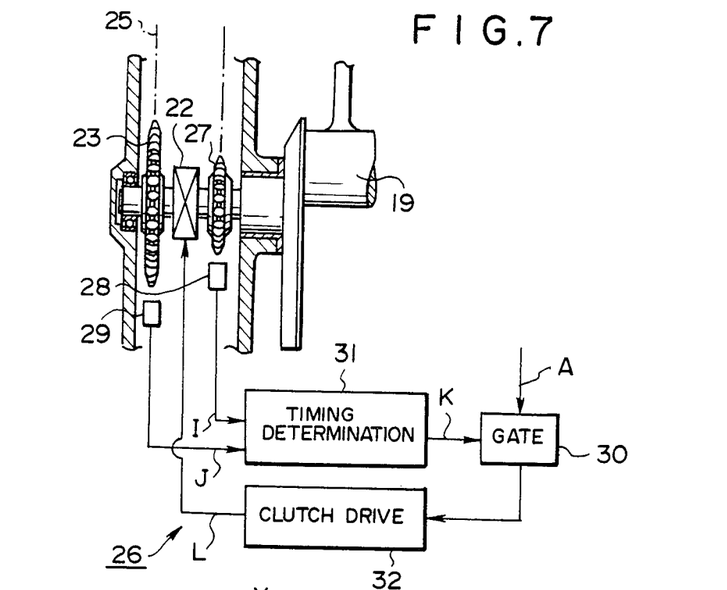
FIG. 7 is a schematic view showing the balancer actuating means employed in the engine of FIGS. 5 and 6.

The balancers 17 and 18 must be driven keeping a predetermined phase relation to the crankshaft 19 as will be described later. Thus there is provided a balancer actuating means 26 which engages the electromagnetic clutch 22 at a predetermined time. The balancer actuating means 26 comprises a first pickup 28 which detects the position of a camshaft driving sprocket 27 fixed to the crankshaft 19, a second pickup 29 which detects the position of the balancer driving sprocket 23, a timing determination circuit 31 which detects the phase relation between the crankshaft 19 and the balancers 17 and 18 based on signals I and J from the pickups 28 and 29, and outputs a gate opening signal K to a gate 30 when the crankshaft 19 and the crankshaft 19 and the balancers 17 and 18 take a predetermined phase relation, and a clutch driving circuit 32 which receives said cylinder-reduction signal A from the cylinder number control circuit 6 shown in FIGS. 2 and 3 and outputs a clutch engaging signal L to the electromagnetic clutch 22 when the gate 30 is opened. Thus the electromagnetic clutch 22 is engaged at the predetermined time so that the balancers 17 and 18 are driven by the crankshaft 19 maintaining the predetermined phase relation thereto when the operating state of the engine 1 is changed from the full-displacement state to the part-displacement state under the control of the cylinder-reduction signal A.

When said cylinder number control circuit 6 generates the cylinder-reduction signal A in the manner described above, the actuator 5 closes the shutter valves 4 provided in the second and third intake passages 2b and 2c of the intake manifold 2. Therefore, supply of air-fuel mixture to the second and third cylinders C2 and C3 is cut, and thus the engine 1 operates in the part-displacement state with only the first and fourth cylinders C1 and C4 outputting power or being operative.

The cylinder-reduction signal A outputted from the cylinder number control circuit 6 when the engine 1 is to be operated in the part-displacement state is inputted into the gate 30 in the balancer actuating means 26 to be further inputted into the clutch driving circuit 32 when the gate 30 is opened by the gate opening signal K from the timing determination circuit 31, i.e. when the crankshaft 19 and the balancers 17 and 18 take the predetermined phase relation, whereby the clutch engaging signal L is outputted from the clutch driving circuit 32 to the electromagnetic clutch 22. The electromagnetic clutch 22 is thus engaged and the first and second balancers 17 and 18 are driven by the crankshaft 19 by way of the chain 25 keeping the predetermined phase relation to the crankshaft 19.

Figure 11:
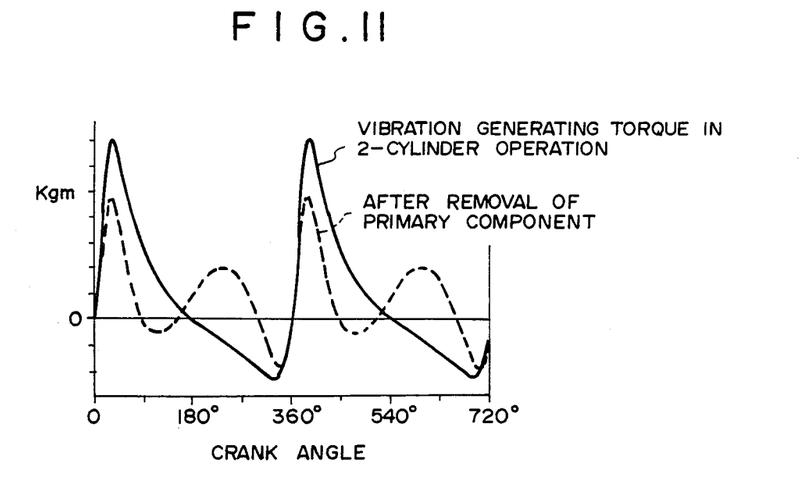
FIG. 11 is a graph showing the difference in torque fluctuation between before and after removal of the primary vibration generating moment.

The balancers 17 and 18 driven by the crankshaft 19 are arranged to compensate for the primary component of torque fluctuation due to explosion in the working cylinders C1 and C4. Since the primary component of the torque fluctuation due to explosion in the cylinders C1 and C4 is thus cut, vibration of the engine 1 during idling in the part-displacement state, in which vibration of the engine is especially strong, is attenuated as shown in FIG. 11.

Figure 4:
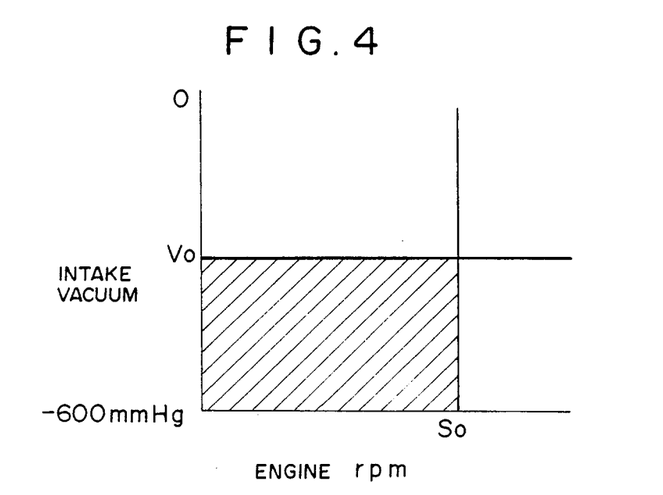
FIG. 4 is a graph showing an operating region for determining whether the engine is operated in the full-displacement state or in the part-displacement state.

When the operating region of the engine 1 deviates from the part-displacement operation region represented by the hatched region in FIG. 4, output of the cylinder-reduction signal A from the cylinder number control circuit 6 is interrupted, whereby the operating state of the engine 1 is changed to the full-displacement state and the electromagnetic clutch 22 of the balancer actuating means 26 in disengaged to stop the balancers 17 and 18.

Now a concrete example of the balancer will be described in detail. The balancers are for attenuating torque fluctuation due to explosion during the part-displacement operation (two-cylinder operation in this embodiment), and in the following description, they are arranged to remove the primary vibration generating moment due to the explosion. That is, since the pistons in the inoperative cylinders reciprocate even during the part-displacement operation of the engine, and accordingly grating mass and reciprocating mass always balance with each other, and since the secondary vibration generating moment and the following vibration generating moments due to the explosion are very small as compared with the primary vibration generating moments, the secondary and the following vibration generating moments are neglected.

Figure 8:
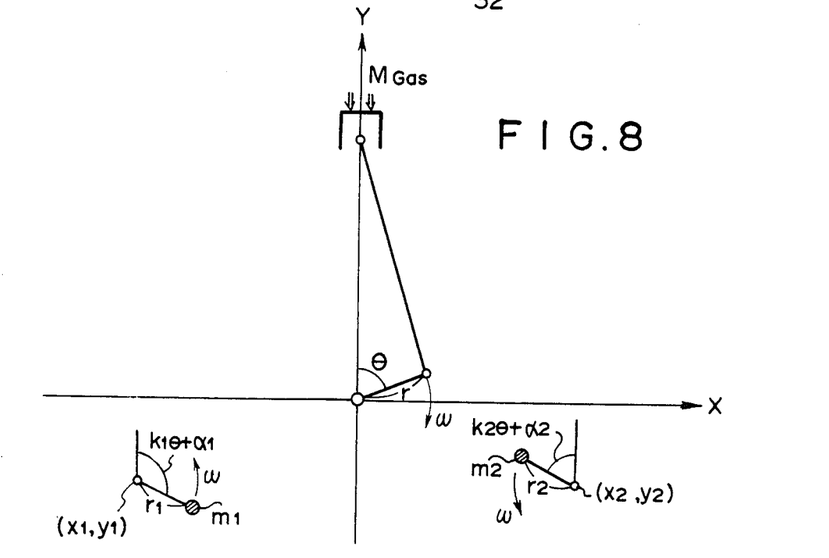
FIG. 8 is a view for illustrating the operation of the balancer employed in the engine of FIGS. 5 and 6.

In FIG. 8, there is imagined a coordinate plane whose origin is on the rotational axis of the crankshaft, whose y-axis extends in the direction of the central axis of the cylinder and whose x-axis extends perpendicularly to both the y-axis and the crankshaft 19. Then it is assumed that the coordinates of the rotational center of the shaft portion 17a of the first balancer 17 are (x1,y1) and the same of the second balancer 18 are (x2,y2). Further, it is assumed that the shaft portions 17a and 18a of the balancers 17 and 18 extend in parallel to the crankshaft 19, and the weight portions 17b and 18b are spaced from one end face of the crankshaft 19 in the axial direction thereof. Symbols are defined as follows.

r: radius of the crankshaft
$\theta$: angular position of the crankshaft
$\omega$: angular velocity of the crankshaft
D: diameter of the cylinders
mi: mass of i-th balancer
ri: distance between the center of gravity of mi and the rotational center of the same
ki: the rotational direction of the i-th balancer (being "1" when rotating in the same direction as the crankshaft 19, and otherwise "0")
a1,b1,a2,b2: torque harmonic coefficients The vibration generating moment MGAS due to the explosion is represented by the following formula.

$$MGAS = 2 \times \pi/4 \times D^2 r \times (a1 \cos\theta + b1 \sin\theta + a2 \cos 2\theta b2 \sin 2\theta + \ldots) \quad (1)$$

Since the $2\theta$ term and the following terms corresponding to the secondary vibration generating moment and the following vibration generating moments are neglected, the formula (1) is rewritten as follows.

$$MGAS = 2 \times \pi/4 \times D^2 \times r \times (a1 \cos\theta + b1 \sin\theta) \quad (1)'$$

On the other hand, moment MBAL generated by the first and second balancers 17 and 18 is represented by the following formula.

$$MBAL = -\sum_{i=1}^{2} x_i m_i r_i \omega^2 \times \cos(k_i\theta + a_i) + \sum_{i=1}^{2} y_i m_i r_i \omega^2 \times \sin(k_i\theta + a_i) \quad (2)$$

In order for the balancers 17 and 18 to statically balance with each other, the following two formulas must be satisfied.

$$m1r1 \cos \alpha 1 + m2r2 \cos \alpha 2 = 0 \quad (3)$$

$$m1r1 \sin \alpha 1 + m2r2 \sin \alpha 2 = 0 \quad (4)$$

Since the balancers 17 and 18 are rotated in the direction opposite to the crankshaft 19 in this embodiment, the value of ki is fixed at (−1) in the following calculation.

In order for the MGAS and MBAL to balance with each other independent of the value of $\theta$, the sum of the sin $\theta$ terms of the formulas (1)' and (2) and the sum of the cos $\theta$ terms of the formulas (1)' and (2) must be zero each. Therefore, $$-x1m1r1\omega^2 \cos \alpha 1 - x2m2r2\omega^2 \cos \alpha 2 + y1m1r1\omega^2 \sin \alpha 1 + y2m2r2\omega^2 \sin \alpha 2 = -2 \times \pi/4 \times D^2 \times r \times a1 \quad (5)$$

$$-x1m1r1\omega^2 \sin \alpha 1 - x2m2r2\omega^2 \sin \alpha 2 - y1m1r1\omega^2 \cos \alpha 1 - y2m2r2\omega^2 \cos \alpha 2 = -2 \times \pi/4 \times D^2 \times r \times b1 \quad (6)$$

Accordingly, by determining the values of m1, m2, r1, r2, $\alpha$1, $\alpha$2, x1, x2, y1 and y2 to satisfy all the formulas (3), (4), (5) and (6), the primary vibration generating moment due to the explosion can be removed by the balancers 17 and 18. In this case, MGAS is in proportion to load on the engine while MBAL is in proportion to the square of the engine speed. Therefore, the primary vibration generating moment cannot be always nullified. In other words, the primary vibration generating moment can be completely removed by the balancers 17 and 18 only in a certain particular operating condition. In order to specify the operating condition in which the primary vibration generating moment is to be nullified, for example, the rpm of the engine mount resonance point is specified as well as the average effective pressure (engine load), and the torque harmonic coefficients a1 and b1 are determined based on actual engine data. Since the values of x1, x2, y1, y2, k1 and k2 can be freely selected at the designing stage, and each of the m1r1 and m2r2 can be handled as a variable, the unknowns are m1r1, m2r2, $\alpha$1 and $\alpha$2 after all. These unknowns can be derived from the formulas (3), (4), (5) and (6) (m1, m2, r1 and r2 may be specified after specifying m1r1 and m2r2).

Figure 9:
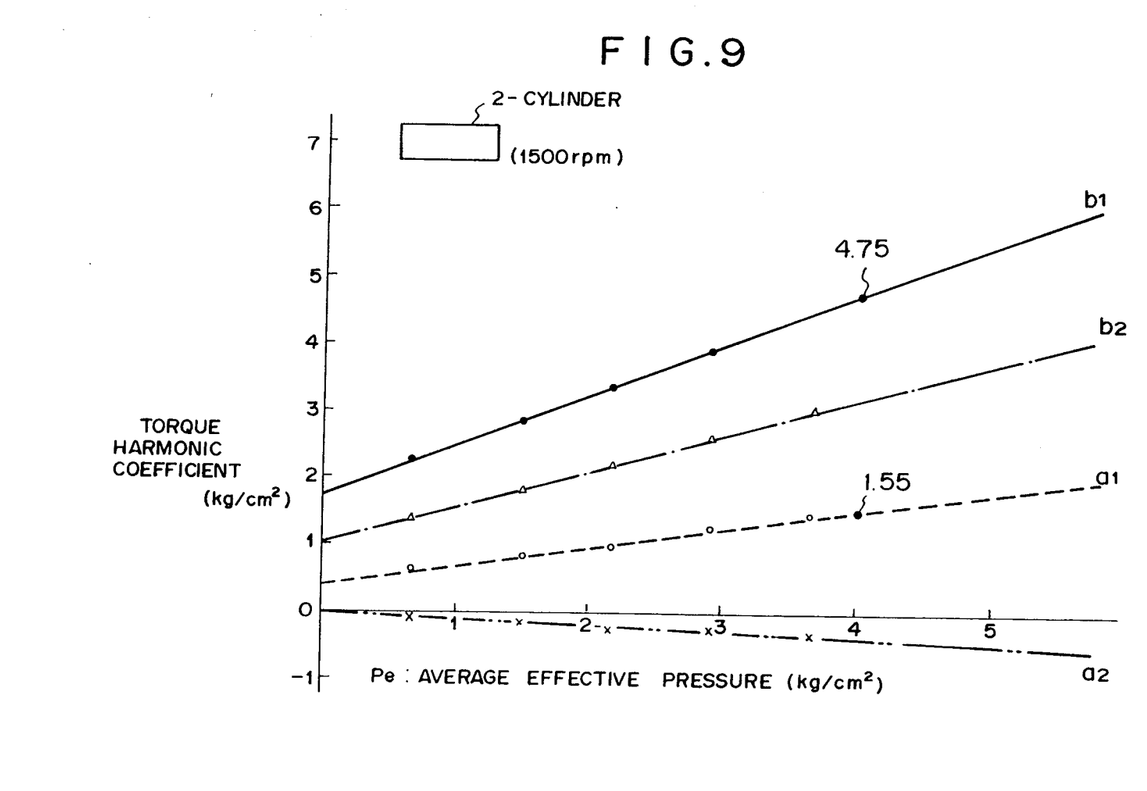
FIG. 9 is a graph showing torque harmonic coefficients.

Now concrete numerical values of the above values will be obtained based on actual engine data by way of example. For this purpose, values of torque harmonic coefficients a1 and b1 when the average effective pressure is 4 kg/cm² are obtained according to FIG. 9. That is, $$a1 = 1.55 \ (kgf/cm^2)$$

$$b1 = 4.75 \ (kgf/cm^2)$$

When it is assumed D = 7.7(cm) and r = 4(cm), the primary vibration generating moment MGAS due to the explosion can be written as follows according to the formula (1)'.

$$MGAS = 5.77 \cos\theta + 17.7 \sin\theta \quad (1)''$$

Therefore, the formulas (5) and (6) can be rewritten as follows.

$$-x1m1r1\omega^2 \cos \alpha 1 - x2m2r2\omega^2 \cos \alpha 2 + y1m1r1\omega^2 \sin \alpha 1 + y2m2r2\omega^2 \sin \alpha 2 = -5.77 \quad (5)'$$

$$-x1m1r1\omega^2 \sin \alpha 1 - x2m2r2\omega^2 \sin \alpha 2 - y1m1r1\omega^2 \cos \alpha 1 - y2m2r2\omega^2 \cos \alpha 2 = -17.7 \quad (6)'$$

By substituting m1r1=A, m2r2B, sin $\alpha$1=C, cos $\alpha$1=D, sin $\alpha$2=E and cos $\alpha$2=F into the formulas (3), (4), (5)' and (6)', the following are obtained.

$$AD + BF = 0 \quad (3)'$$

$$AC + BE = 0 \quad (4)'$$

$$AD(-x1\omega^2) - BF(x2\omega^2) + AC(y1\omega^2) + BE(y2\omega^2) = -5.77 \quad (5)''$$

$$-AC(x1\omega^2) - BE(x2\omega^2) - AD(y1\omega^2) - BF(y2\omega^2) = -17.7 \quad (6)''$$

The formulas (3)' and (4)' can be rewritten as follows.

$$D = -(B/A)F \quad (3)''$$

$$C = -(B/A)E \quad (4)''$$

Since $C^2 + D^2 = 1$ and $F^2 + E^2 = 1$, $$C^2 + D^2 = 1 = (-(B/A)F)^2 + (-(B/A)E)^2$$

$$= B^2/A^2(F^2 + E^2) = B^2/A^2$$

Therefore, $$A^2 = B^2 (A>0, B>0)$$

$$\therefore A = B \quad (i)$$

In order to obtain the relation between C, D, E and F, the formulas (3)″ and (4)″ are substituted into the formulas (5)″ and (6)″ to delete A, C and D, thereby obtaining the following formulas.

$$BF\omega^2(x1-x2) + BE\omega^2(y2-y1) = -5.77 \quad (7)$$

$$BF\omega^2(y1-y2) - BE\omega^2(x2-x1) = -17.7 \quad (8)$$

Then the values of x1, x2, y1 and y2 are determined as follows.

$$x1 = -180 \times 10^{-3} \text{ (m)}$$

$$x2 = 180 \times 10^{-3} \text{ (m)}$$

$$y1 = -30 \times 10^{-3} \text{ (m)}$$

$$y2 = -30 \times 10^{-3} \text{ (m)}$$

Then the following can be derived from the formula (7) taking into account that $y1 = y2$.

$$B = \frac{-5.77}{F\omega^2(x1-x2) + E\omega^2(y2-y1)}$$

$$= \frac{-5.77}{F\omega^2(x1-x2)}$$

Further, $B > 0$, $x1 - x2 < 0$. Therefore, $$F > 0 \quad (ii)$$

Similarly, the following can be derived from the formula (8) taking into account that $y1 = y2$.

$$B = \frac{-17.7}{F\omega^2(y1-y2) - E\omega^2(x2-x1)}$$

$$= \frac{-17.7}{-E\omega^2(x2-x1)}$$

Further, $B > 0$, $x2 - x1 > 0$. Therefore, $$E > 0 \quad (iii)$$

Further, since $A = B$ (formula (i)), the following can be derived from the formula (3)′ and (4)′.

$$D = -F \quad (iv)$$

$$C = -E \quad (v)$$

In order to obtain the value of F, the formulas (7) and (8) are rewritten as follows taking into account $y1 = y2$.

$$BF\omega^2(x1-x2) = -5.77 \quad (7)'$$

$$-BE\omega^2(x2-x1) = -17.7 \quad (8)'$$

Then the formula (7)′ is divided by the formula (8)′ to obtain the following.

$$\frac{F(x1-x2)}{-E(x2-x1)} = \frac{-5.77}{-17.7} = 0.32599 \quad (9)$$

By solving the formula (9) for F taking into account that $E^2 + F^2 = 1$, $F > 0$ and the values of x1 and x2, $F = 0.3099$ is obtained.

The value of B can be derived from the formula (7)′ as follows.

$$B = m2r2 = \frac{-5.77}{F\omega^2(x1-x2)}$$

$$= \frac{-5.77}{0.3099 \times (157.08)^2 \times (-0.36)} = 2.096 \times 10^{-3}$$

By converting this into MKS unit, the following is obtained.

$$B = 2.054 \times 10^{-2} \text{ (kgm)} \quad (11)$$

Since the values of B and F have been found, the following formulas (12) to (15) are derived respectively from the formulas (i), (iv), (iii) (together with the relation $E^2 + F^2 = 1$), and (v).

$$A = B = 2.054 \times 10^{-2} \text{ (kgm)} \quad (12)$$

$$D = -F = -0.3099 \quad (13)$$

$$E = +0.9508 \quad (14)$$

$$C = -E = -0.9508 \quad (15)$$

Next, the values of $\alpha 1$ and $\alpha 2$ are obtained.

$$F(>0) = \cos \alpha 2 = 0.3099$$

Therefore, $$\alpha 2 = 71.95° \text{ or } -71.95°$$

$$E(>0) = \sin \alpha 2 = 0.9508$$

Therefore, $$\alpha = 71.95° \text{ or } 108.05°$$

In order to satisfy both the conditions of E and F, $$\alpha 2 = 71.95° \quad (16)$$

In the similar manner, the following is obtained.

$$\alpha 1 = -108.05° \quad (17)$$

Next, the numerical values for the weight portions 17b and 18b of the balancers 17 and 18 will be obtained. It is assumed that each weight portion 17b (18b) is machined out from S45C integrally with the shaft portion 17a (18a) and is semi-circular in cross-section.

Figure 12:
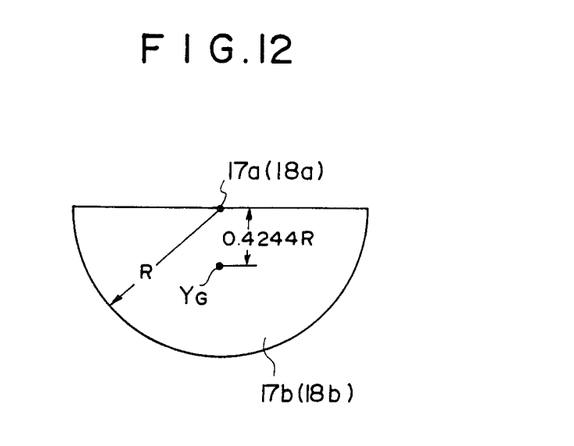
FIG. 12 is a schematic view showing an example of the weight portion of the balancer.

The position of the center of gravity YG of the weight portion 17b (18b) which is semi-circular in cross-section is represented as follows.

$$YG = \frac{4R}{3\pi} = 0.4244R (= r1 = r2)$$

wherein R represents the radius of the weight portion 17b (18b) as shown in FIG. 12. Since the specific gravity of S45C is 7.8 (g/cm³), the following results when it is assumed that the thickness of the weight portion 17b (18b) is 10 cm.

$$m1r1 = m2r2 = \left(\frac{\pi R^2}{2} \times 10 \times 7.8\right) \times 0.4244R$$

$$= 2054 \text{ (gcm)}$$

Accordingly, R=3.406 (cm).

All the factors are thus given numerical values.

Figure 10:
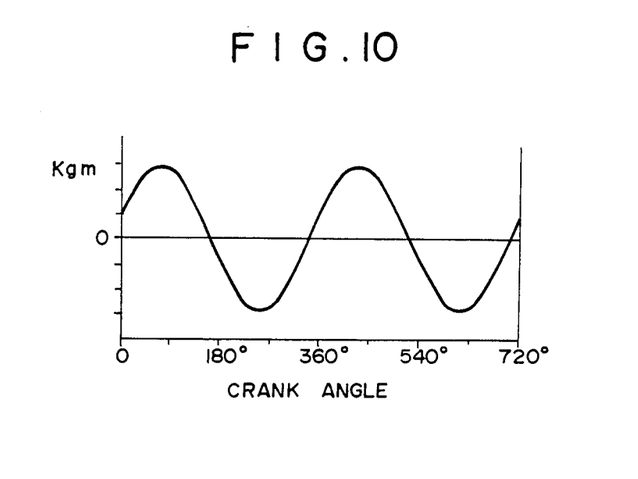
FIG. 10 is a graph showing the primary vibration generating moment removed by the balancer.

In FIG. 10, the primary vibration generating moment removed by the balancers obtained according to the example described above, and in FIG. 1, there is shown torque fluctuation after removal of the primary vibration generating moment (dotted line) together with torque fluctuation before removal of the same (solid line). As can be seen from FIG. 11, the primary vibration generating moment is removed in the part-displacement operation of the engine in accordance with the present invention, whereby torque fluctuation is highly attenuated.

The present invention need not be limited to the embodiment described above but various modifications can be made. For example, though in the above embodiment, a part of the cylinders are made inoperative by closing the intake passages thereto by shutter valves, they may be made inoperative by keeping the intake and exhaust valves closed by means of valve drive control devices which are provided between the camshaft and the valves to selectively connect and disconnect the camshaft to the valves as described in Japanese Unexamined Patent Publication No. 52(1977)-67420.

I claim:

1. A multiple-displacement engine which can be operated either in a full-displacement state in which all the cylinders thereof are operative or a part-displacement state in which a part of the cylinders are inoperative, and comprises fuel supply interruption means for cutting fuel supply to a part of the cylinders, operating condition detecting means for detecting operating condition of the engine, and cylinder number control means which determines the number of cylinders to be supplied with fuel according to a signal from the operating condition detecting means and actuates the fuel supply interruption means, characterized by having balancer means for generating moment which attenuates torque fluctuation due to explosion in the operative cylinders in the part-displacement state of the engine, and balancer actuating means which receives a control signal from the cylinder number control means and actuates the balancer when the engine is operated in the part-displacement state.

2. A multiple-displacement engine as defined in claim 1 in which said balancer means comprises a balancer shaft extending in parallel to the crankshaft of the engine and a weight eccentrically provided on the balancer shaft, and is adapted to be driven by the crankshaft by way of clutch means.

3. A multiple-displacement engine as defined in claim 2 in which said clutch means is disposed between the balancer shaft and the crankshaft, and said balancer actuating means comprises the clutch means and timing control means which connects the balancer shaft to the crankshaft in a predetermined phase in response to a cylinder-reduction signal from the cylinder number control means.

4. A multiple-displacement engine as defined in claim 3 in which said timing control means comprises position detecting means for detecting the positions of the crankshaft and the balancer shaft, gate means provided between the cylinder number control means and the clutch means, and timing determination means which outputs a signal for opening the gate means at a predetermined time in response to a signal from the gate means.

5. A multiple-displacement engine as defined in claim 2 in which said balancer shaft includes an even number of shafts and is arranged to statically balance by itself, the balancer shaft being adapted to be rotated in the direction opposite to the crankshaft.

6. A multiple-displacement engine as defined in claim 2 in which a pair of said weights are provided on opposite ends of the balancer shaft.

7. A multiple-displacement engine as defined in claim 1 in which said operating state detecting means comprises an engine load sensor and said cylinder number control means actuates said fuel supply interruption means to change the operating state of the engine to the part-displacement state when load on the engine is lighter than a predetermined value.

8. A multiple-displacement engine as defined in claim 7 in which said operating state detecting means further comprises an engine speed sensor for detecting the engine speed and said cylinder number control means actuates said fuel supply interruption means to change the operating state of the engine to the part-displacement state when the engine speed is lower than a predetermined value.

* * * * *